United States Patent
Dharmadhikari et al.

(10) Patent No.: US 10,519,933 B2
(45) Date of Patent: Dec. 31, 2019

(54) METHOD OF OPERATING A WIND TURBINE SYSTEM INCLUDING AN ENERGY STORAGE SYSTEM

(71) Applicant: General Electric Company, Schenectady, NY (US)

(72) Inventors: Parag Rameshchandra Dharmadhikari, Neufahrn b. Freising (DE); Robert Roesner, Oberschleissheim (DE)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 15/494,661

(22) Filed: Apr. 24, 2017

(65) Prior Publication Data

US 2018/0306169 A1 Oct. 25, 2018

(51) Int. Cl.
*F03D 9/11* (2016.01)
*F03D 9/25* (2016.01)
(Continued)

(52) U.S. Cl.
CPC .............. *F03D 9/11* (2016.05); *F03D 7/0284* (2013.01); *H02J 3/32* (2013.01); *H02J 3/386* (2013.01); *H02J 11/00* (2013.01); *F05B 2220/7064* (2013.01); *F05B 2220/70646* (2013.01); *F05B 2260/903* (2013.01); *F05B 2270/335* (2013.01);
(Continued)

(58) Field of Classification Search
CPC .......... F03D 9/11; F03D 9/255; F03D 7/0204; F03D 7/047; F03D 7/022; F03D 7/0244; H02J 11/00; F05B 2220/7064
See application file for complete search history.

(56) References Cited

U.S. PATENT DOCUMENTS

| 3,548,278 A | 12/1970 | Sommeria |
| 5,355,025 A | 10/1994 | Moran et al. |

(Continued)

FOREIGN PATENT DOCUMENTS

WO WO2002/054561 A2 7/2002

OTHER PUBLICATIONS

International Search Report and Written Opinion issued in connection with corresponding PCT Application No. PCT/US2018/029130 dated Jul. 31, 2018.

*Primary Examiner* — Tulsidas C Patel
*Assistant Examiner* — Joseph Ortega
(74) *Attorney, Agent, or Firm* — Dority & Manning, P.A.

(57) ABSTRACT

Systems and methods for operating an energy storage system in a wind turbine system are provided. A wind turbine system can include a wind turbine, a power conversion system operably coupled to the wind turbine and an AC line bus, and an energy storage system coupled to the AC line bus. The energy storage system can include a transformer, a power converter, and an energy storage device and can be configured to store and provide power generated by the wind turbine. The method can include operating the wind turbine system to generate power, determining one or more operating parameters for the wind turbine system, determining an operating mode based on the one or more operating parameters, and controlling the wind turbine system based at least in part on the operating mode. Controlling the wind turbine can control a power flow into or out of the energy storage system.

18 Claims, 11 Drawing Sheets

(51) Int. Cl.
*F03D 7/04* (2006.01)
*H02J 11/00* (2006.01)
*F03D 7/02* (2006.01)
*H02J 3/38* (2006.01)
*H02J 3/32* (2006.01)

(52) U.S. Cl.
CPC ....... *F05B 2270/337* (2013.01); *Y02E 10/723* (2013.01); *Y02E 10/725* (2013.01)

(56) References Cited

U.S. PATENT DOCUMENTS

| | | |
|---|---|---|
| 5,384,696 A | 1/1995 | Moran et al. |
| 5,767,591 A | 6/1998 | Pinkerton |
| 5,907,192 A | 5/1999 | Lyons et al. |
| 7,633,775 B2 | 12/2009 | Datta et al. |
| 8,188,610 B2 * | 5/2012 | Scholte-Wassink ........................ F03D 7/0272 290/44 |
| 8,446,743 B2 | 5/2013 | Gupta et al. |
| 8,867,244 B2 | 10/2014 | Trainer et al. |
| 9,455,568 B2 | 9/2016 | Wagoner et al. |
| 2002/0084655 A1 | 7/2002 | Lof et al. |
| 2002/0087234 A1 | 7/2002 | Lof et al. |
| 2003/0006613 A1 | 1/2003 | Lof et al. |
| 2005/0127680 A1 | 6/2005 | Lof et al. |
| 2006/0126242 A1 | 6/2006 | Datta et al. |
| 2009/0230689 A1 | 9/2009 | Burra et al. |
| 2011/0007534 A1 | 1/2011 | Gupta et al. |
| 2012/0200279 A1 | 8/2012 | Pamulaparthy et al. |
| 2012/0217824 A1 * | 8/2012 | Gupta ................... F03D 7/0272 307/145 |
| 2013/0128636 A1 | 5/2013 | Trainer et al. |
| 2013/0221748 A1 * | 8/2013 | Meinke .................... H01R 3/00 307/31 |
| 2014/0015469 A1 * | 1/2014 | Beaston .................... H02J 3/32 320/101 |
| 2014/0062424 A1 * | 3/2014 | Larsen .................... H02J 3/386 322/24 |
| 2014/0145439 A1 * | 5/2014 | Burra .................... F03D 7/0204 290/44 |
| 2014/0152109 A1 * | 6/2014 | Kanakasabai ........... H02J 9/062 307/66 |
| 2014/0203646 A1 | 7/2014 | Belur et al. |
| 2014/0316592 A1 | 10/2014 | Haj-Maharsi et al. |
| 2014/0319911 A1 * | 10/2014 | Alexander ................ H02J 7/35 307/22 |
| 2015/0008671 A1 | 1/2015 | Palomares Rentero et al. |
| 2015/0012144 A1 * | 1/2015 | Wang ........................ H02J 3/00 700/291 |
| 2015/0042293 A1 * | 2/2015 | Hehenberger ........ F03D 7/0244 322/21 |
| 2015/0123402 A1 * | 5/2015 | Wagoner .................. H01F 3/14 290/44 |
| 2015/0145251 A1 * | 5/2015 | Wagoner ............... F03D 7/0272 290/44 |
| 2015/0180273 A1 * | 6/2015 | Wagoner ................. H02M 1/12 290/50 |
| 2015/0292484 A1 | 10/2015 | Haj-Maharsi |
| 2015/0309119 A1 * | 10/2015 | Berroteran Gil ...... G01R 31/42 324/764.01 |
| 2015/0309123 A1 * | 10/2015 | Berroteran Gil ...... G01R 31/40 324/764.01 |
| 2016/0268940 A1 * | 9/2016 | Achilles ................ H02J 3/1842 |
| 2017/0005470 A1 | 1/2017 | Wagoner et al. |
| 2017/0074247 A1 * | 3/2017 | Smith .................... F03D 7/042 |

* cited by examiner

METHOD OF OPERATING A WIND TURBINE SYSTEM INCLUDING AN ENERGY STORAGE SYSTEM

FIELD OF THE INVENTION

The present disclosure relates generally to renewable energy power systems, and more particular to methods of use of an energy storage system in a renewable energy power system.

BACKGROUND OF THE INVENTION

Renewable energy power systems, such as wind energy power systems and solar energy power systems, can include energy storage systems, which are often coupled to a DC bus of a power converter. For example, wind power systems, such as wind driven doubly-fed induction generator (DFIG) systems or full power conversion systems, can include a power converter with an AC-DC-AC topology and an energy storage system coupled to the DC bus in the power converter.

In a typical configuration, an energy storage system can be configured to store energy generated by the renewable energy power system or provide stored energy from the energy storage system to an electrical grid. However, in an energy storage system coupled to a DC bus in a power converter, large cabinet filters are often needed to filter out an AC component superimposed on a DC component (i.e., ripple and common mode noise with differential mode noise) before energy is provided to one or more energy storage devices in the energy storage system. These filters can be very expensive, complex, and add failure modes, which can reduce reliability, availability, and require resources for maintenance. Further, the cost of these filters can increase as the size of the filter increases. Further, in such a configuration, the one or more energy storage devices in the energy storage system, such as one or more batteries, may not be electrically isolated from the power converter in the renewable energy system, and thus can be susceptible to damage from fault currents and a cause of serious concern for safety due to the floating configuration.

Moreover, in a typical energy storage system coupled to a DC bus of a power converter, energy stored in the energy storage system may not be available during various operating conditions, such as when an electrical grid is experiencing a fault condition requiring isolation of the renewable energy power system as power from the grid may be needed to power a control device configured to control operation of the energy storage system. Further, during excessive wind conditions, grid power may be unavailable to power a yaw system in order to yaw a wind turbine out of the wind to reduce stress on the wind turbine, and aerodynamic braking may be unable to sufficiently slow or stop the wind turbine.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method of operating a wind turbine system. The wind turbine system can include a wind turbine, a power conversion system operably coupled to the wind turbine and an AC line bus, and an energy storage system coupled to the AC line bus. The energy storage system can include a transformer, a power converter, and an energy storage device and can be configured to store and provide power generated by the wind turbine. The method can include operating the wind turbine system to generate power. The method can further include determining, by a control device, one or more operating parameters for the wind turbine system. The method can further include determining, by the control device, an operating mode for the wind turbine system based at least in part on the one or more operating parameters. The method can further include controlling, by the control device, the wind turbine system based at least in part on the operating mode. Controlling the wind turbine system by the control device can include controlling an energy flow into or out of the energy storage system coupled to the AC line bus.

Another example aspect of the present disclosure is directed to a control system for an energy storage system in wind turbine system. The wind turbine system can include a wind turbine, a power conversion system operably coupled to the generator and an AC line bus, and an energy storage system coupled to the AC line bus. The energy storage system can include a transformer, a power converter, and an energy storage device and can be configured to store and provide power generated by the wind turbine. The control system can include can include one or more processors and one or more memory devices configured to store instructions that when executed by the one or more processors cause the one or more processors to perform operations. The operations can include determining one or more operating parameters of the wind turbine system. The operations can further include determining an operating mode for the wind turbine system based at least in part on the one or more operating parameters. The operations can further include controlling the wind turbine system based at least in part on the operating mode. Controlling the wind turbine can include controlling an energy flow into or out of the energy storage system coupled to the AC line bus. Determining one or more operating parameters of the wind turbine system can include determining a grid parameter.

Yet another example aspect of the present disclosure is directed to a Doubly Fed Induction Generator (DFIG) wind turbine system. The wind turbine system can include a DFIG comprising a rotor and a stator, a rotor bus coupled to the rotor, a stator bus coupled to the stator, a power conversion system coupled to the rotor bus, a line bus coupled to the power conversion system, an energy storage system coupled to the line bus, and a control system. The energy storage system can include a transformer, a power converter, and an energy storage device. The energy storage system can be configured to store and provide power generated by the DFIG. The control system can include one or more processors and one or more memory devices configured to store instructions that when executed by the one or more processors cause the one or more processors to perform operations. The operations can include determining one or more operating parameters of the DFIG wind turbine system. The operations can further include determining an operating mode for the DFIG wind turbine system based at least in part on the one or more operating parameters. The operations can further include controlling the DFIG wind turbine system based at least in part on the operating mode. The one or more operating parameters can include one or more of one or more of a grid parameter, a power demand parameter, a power generation parameter, or a wind parameter. Determining an operating mode of the DFIG wind turbine system can include selecting an integrated storage mode, a yaw power backup mode, or an e-brake mode.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
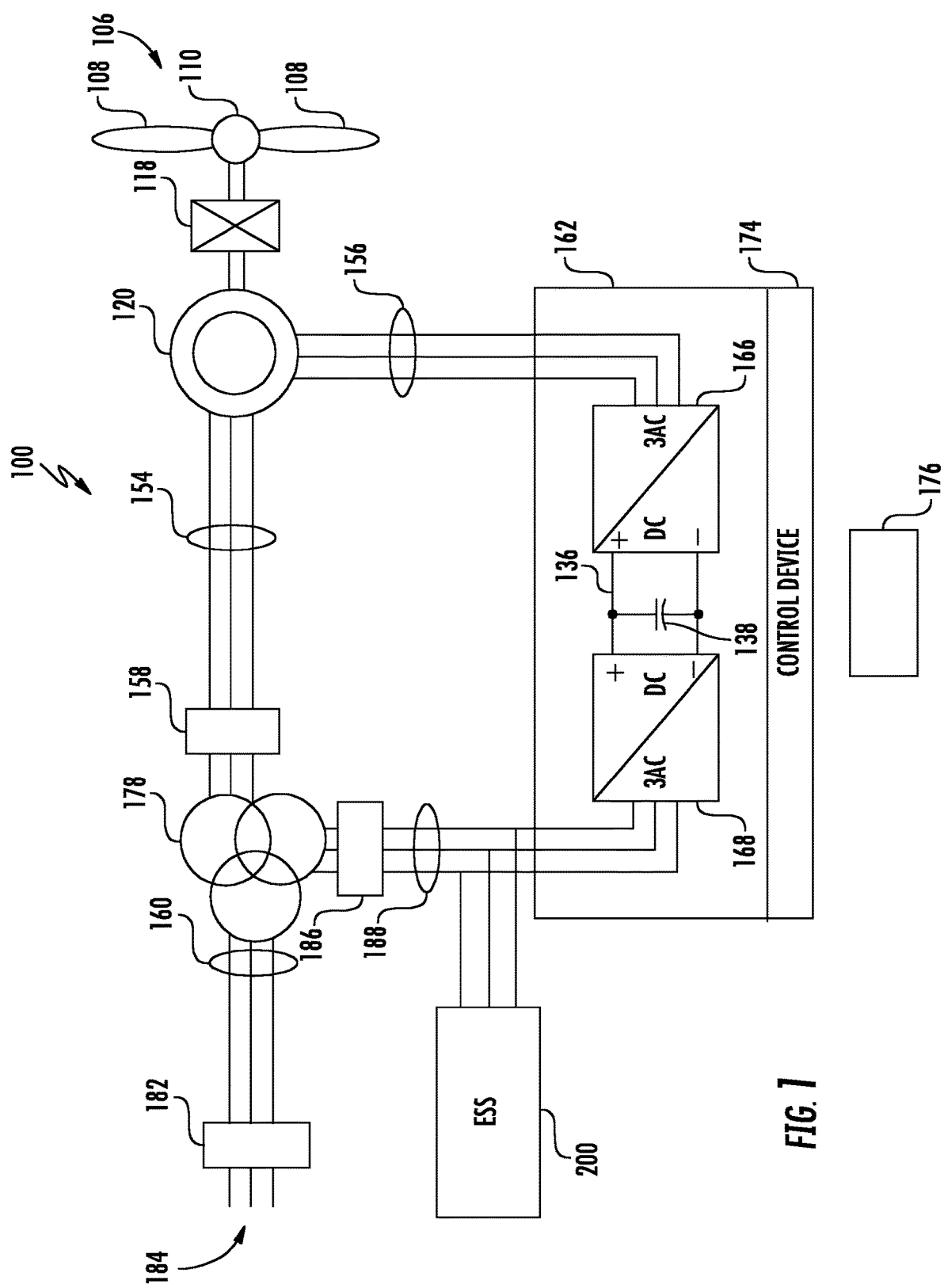
FIG. 1 depicts an example power system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to energy storage systems and methods of use of energy storage systems in power systems. More particularly, an energy storage system can be coupled to an AC line bus power system to store and provide energy in a plurality of operation modes. For example, the energy storage system can be coupled to the AC line bus of a doubly fed induction generator in a wind turbine power system.

The energy storage system can include a transformer configured to transform AC power from a first voltage to AC power at a second voltage. For example, the transformer can be a two-winding transformer configured to convert a multiphase (e.g., three-phase) alternating current from a first voltage to a second voltage. The transformer can be a step-down transformer wherein the second voltage is lower than the first voltage. Further, the transformer can be configured to provide isolation to one or more energy storage devices in the energy storage system, such as, for example, by using a two-winding inductively-coupled transformer.

The energy storage system can further include a bi-directional AC to DC power converter coupled to the transformer. The bi-directional AC to DC power converter can be configured to convert the AC power at the second voltage to a DC power. For example, after the AC power is transformed by the transformer from AC power at the first voltage into AC power at a second voltage, the bi-directional AC to DC power converter can convert the AC power at the second voltage to a DC power. The DC power can be at the second voltage, or the bi-directional AC to DC power converter can convert the AC power at the second voltage into DC power at another voltage. In an embodiment, the bi-directional AC to DC power converter can be a four-quadrant charge-discharge power converter. The bi-directional AC to DC power converter can provide the DC power to a DC bus.

The energy storage system can further include an energy storage device coupled to the bi-directional AC to DC power converter. For example, one or more energy storage devices, such as one or more batteries, capacitors, fuel cells, for other energy storage devices can be coupled to the DC bus, and can be configured to store power received by the energy storage system. In an embodiment, the energy storage system can include a ground reference, such as a neutral earth ground reference. In one or more embodiments, the energy storage devices can be coupled to the ground reference in order to ground the one or more energy storage devices.

The energy storage system can further include one or more capacitors coupled to the DC bus. The energy storage system can be configured to receive power generated by wind turbine, such as a rotor of a DFIG. For example, a DFIG can include a rotor and a stator, such as a synchronously connected stator configured to generate AC power synchronously with power on a grid, and a rotor. The rotor can be coupled to a rotor bus, and the stator can be coupled to a stator bus. A power conversion system can be coupled between the rotor bus and a line bus, and can be configured to convert power from the rotor. For example, the power conversion system can be an AC to DC to AC power conversion system configured to convert AC power generated by the rotor into an AC power suitable for provision to a grid, such as synchronous AC power.

In one or more embodiments, the AC power generated by the rotor and converted by the power conversion system can be provided to a transformer in order to step up the voltage of the AC power. For example, a three-winding transformer can be coupled to the stator bus, the line bus, and an electrical grid. The three-winding transformer can be configured to convert the multiphase AC power from both the stator and the rotor into multiphase AC power suitable for provision to an electric grid. The energy storage system can be coupled to the line bus between the three-winding transformer and the power conversion system.

As mentioned, the energy storage system can be configured to store power received by the energy storage system. For example, the energy storage system can receive AC multiphase power from a line bus that was generated by the rotor of a DFIG. However, the energy storage system can further be configured to provide electrical power from the energy storage device to an electrical grid. For example, the energy storage device coupled to a DC bus in an energy storage system can be configured to provide power to the DC bus. A bi-directional converter coupled to the DC bus can be configured to receive the DC power provided by the energy storage device and convert it to an AC power to be provided to the two-winding transformer. The two-winding transformer can be configured to step up the AC power provided by the bi-directional power converter into an AC power at the same voltage as the AC line bus of a DFIG wind turbine system. The power from the line bus can then be provided to an electrical grid, such as by providing it to a winding of a three-winding transformer configured to convert AC power on the line bus into AC power at a voltage suitable for provision to an electrical grid.

The energy storage system can further be configured to operate in a yaw power backup mode. For example, a wind turbine system can include a yaw system configured to yaw a wind turbine into or out of the wind. The yaw system can be used, for example, when the wind speed exceeds a threshold in order to position the turbine at an angle to the wind in order to reduce the load and stresses on the wind turbine. In a yaw power backup mode, a control device can be configured to control operation of the energy storage system to provide power to the yaw system. In an embodiment, the energy storage system can be configured to provide power to the yaw system when power is not available from an electrical grid, such as, for example, when a fault has occurred on an electrical grid. In such a situation, a wind turbine system and/or wind farm may be electrically isolated from the electrical grid by opening one or more breakers. The energy storage system can be configured to provide backup power to a yaw system to allow for the yaw system to control the turbine into a desired yaw angle.

The energy storage system can further be configured to operate in an integrated storage mode. For example, an energy storage system can be configured to provide power when the power demand from a power generation setpoint exceeds the power generation from the turbine and/or wind farm. For example, an electrical utility company can schedule a dispatch for a wind turbine and/or wind farm for a particular period, such as a 10 minute interval based on forecasted wind conditions. When the power demand (i.e., the scheduled dispatch) exceeds the power generated by the wind turbine and/or wind farm, the energy storage system can be configured to provide power to meet the power demand. Similarly, when the power demand is less than the power generated by the wind turbine and/or wind farm, surplus power can be provided from the wind turbine to the energy storage system in order to store the energy for a future time period. In this way, the energy storage system can be configured to operate in an integrated storage mode wherein power is provided by or to the energy storage system depending upon the power demand and/or power generation of the wind turbine and/or wind farm.

The energy storage system can further be configured to operate in an e-brake mode. For example, a wind turbine may be generating power when a condition occurs that requires the wind turbine to be shut down. For example, an electrical grid may experience a fault requiring a wind turbine to be islanded by disconnecting the wind turbine from the electrical grid. In such a situation, the wind turbine may need to be brought to a stop. For example, an aerodynamic braking mode may be activated on the wind turbine in order to pitch the blades of the wind turbine such that the wind turbine decelerates. If, however, the aerodynamic braking mode is not able to sufficiently decelerate the wind turbine, a control device can be configured to activate an e-brake (e.g., emergency-brake or energy-brake) mode wherein power generated by the wind turbine is provided to the emergency storage system to provide faster and controlled braking for the wind turbine.

A control device can be configured to determine one or more operating parameters, and based on the one or more operating parameters, control the wind turbine system into an operation mode, such as an integrated storage mode, a yaw power backup mode, and an e-brake mode.

In an embodiment, the energy storage system can be coupled to a plurality of wind turbines, such as a plurality of DFIGs. For example, an energy storage system can be configured to receive electrical power generated by a rotor of the plurality of DFIGs by, for example, coupling the energy storage system to a line bus for each DFIG in the plurality.

In an embodiment, the energy storage system can be a stand-alone energy storage system, which can be configured to be added to an existing wind turbine system. For example, an advantage provided by an energy storage system according to example aspects of the present disclosure is that the energy storage system can be retrofitted onto an existing wind turbine system. For example, an existing wind turbine system may include a power conversion system coupled to a transformer. The energy storage system according to example aspects of the present disclosure can be configured to be retrofitted to the existing wind turbine by, for example, connecting the energy storage system to a line bus between a power conversion system and a transformer in the existing wind turbine system.

In an embodiment, the energy storage system according to example aspects of the present disclosure can be configured to provide emergency power to one or more components of the wind turbine system. For example, in addition to providing backup power to a yaw system, the energy storage system can be configured to provide power to one or more control devices configured to control an operation mode of the wind turbine system such as, for example, when power from a grid is not available.

In this way, the systems and methods according to example aspects of the present disclosure can have a technical effect of allowing for an energy storage system to be used operate in a yaw power backup mode, an e-brake mode, and an integrated storage mode. Further, by using a transformer which provides electrical isolation and absorbs common mode noise, the filter circuit required by a conventional energy storage system coupled to a DC link in a power conversion system can be eliminated. Moreover, this configuration allows for the one or more energy storage devices in the energy storage system to be coupled to a ground, thereby reducing the likelihood of damage from fault currents. Additionally, the energy storage system according to example aspects of the present disclosure can be retrofitted to an existing wind turbine system to provide energy storage and other advantages.

With reference now to the FIGS., example embodiments of the present disclosure will now be discussed in detail. FIG. 1 depicts an example wind driven doubly-fed induction generator (DFIG) turbine system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as synchronous, asynchronous, permanent magnet and full-power conversion wind turbines, solar, gas turbine, or other suitable power generation systems.

In the example system 100, a rotational component 106 includes a plurality of rotor blades 108 coupled to a rotating hub 110. The rotational component 10 is coupled to an optional gear box 118, which is, in turn, coupled to a generator 120. In accordance with aspects of the present disclosure, the generator 120 is a doubly fed induction generator (DFIG) 120.

DFIG 120 can include a rotor and a stator. DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) or similar switching elements. The rotor side converter 166 and the line side converter 168 can be coupled via a DC link 136 across which is the DC link capacitor 138. In an embodiment, a transformer 178, such as a three-winding transformer, can be coupled to the line bus 188 and the stator bus 154. The transformer 178 can convert the voltage of power from the line bus 188 and the stator bus 154 to a voltage suitable for providing to an electrical grid 160.

The power conversion system 162 can be coupled to a control device 174 to control the operation of the rotor side converter 166 and the line side converter 168. It should be noted that the control device 174, in typical embodiments, is configured as an interface between the power conversion system 162 and a control system 176. In one implementation, the control device 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and in other aspects of the wind turbine system 100, such as a bi-directional AC to DC power converter used in an energy storage system 200.

In operation, alternating current power generated at DFIG 120 by rotation of the rotational component 106 is provided via a dual path to electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line side converter 168 converts the DC power on the DC link 136 into AC output power suitable for the electrical grid 160, such as AC power synchronous to the electrical grid 160, which can be transformed by transformer 178 before being provided to the electrical grid 160. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 160 (e.g. 50 Hz/60 Hz).

Various circuit breakers and switches, such as a line bus breaker 186, stator bus breaker 158, and grid breaker 182 can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to example aspects of the present disclosure, an energy storage system 200 can be coupled to the line bus 188 of the wind turbine system 100. The present disclosure is discussed with reference to an energy storage system 200 for purposes of illustration and discussion. Those of ordinary skill in the art, using the disclosures provided herein, should understand that aspects of the present disclosure are also applicable in other energy storage systems.

The energy storage system 200 can be coupled to the line bus 188 between the power converter 162 and a transformer 178. The energy storage system 200 can be used to provide power to the line bus 188 or rotor bus 154 under certain conditions. For instance, the energy storage system 200 can be used to provide power to the line bus 188 to increase output of the wind turbine system 100 when wind speed drops. Power can also be supplied and stored in the energy storage system 200 during operation of the wind turbine system 100.

Figure 2:
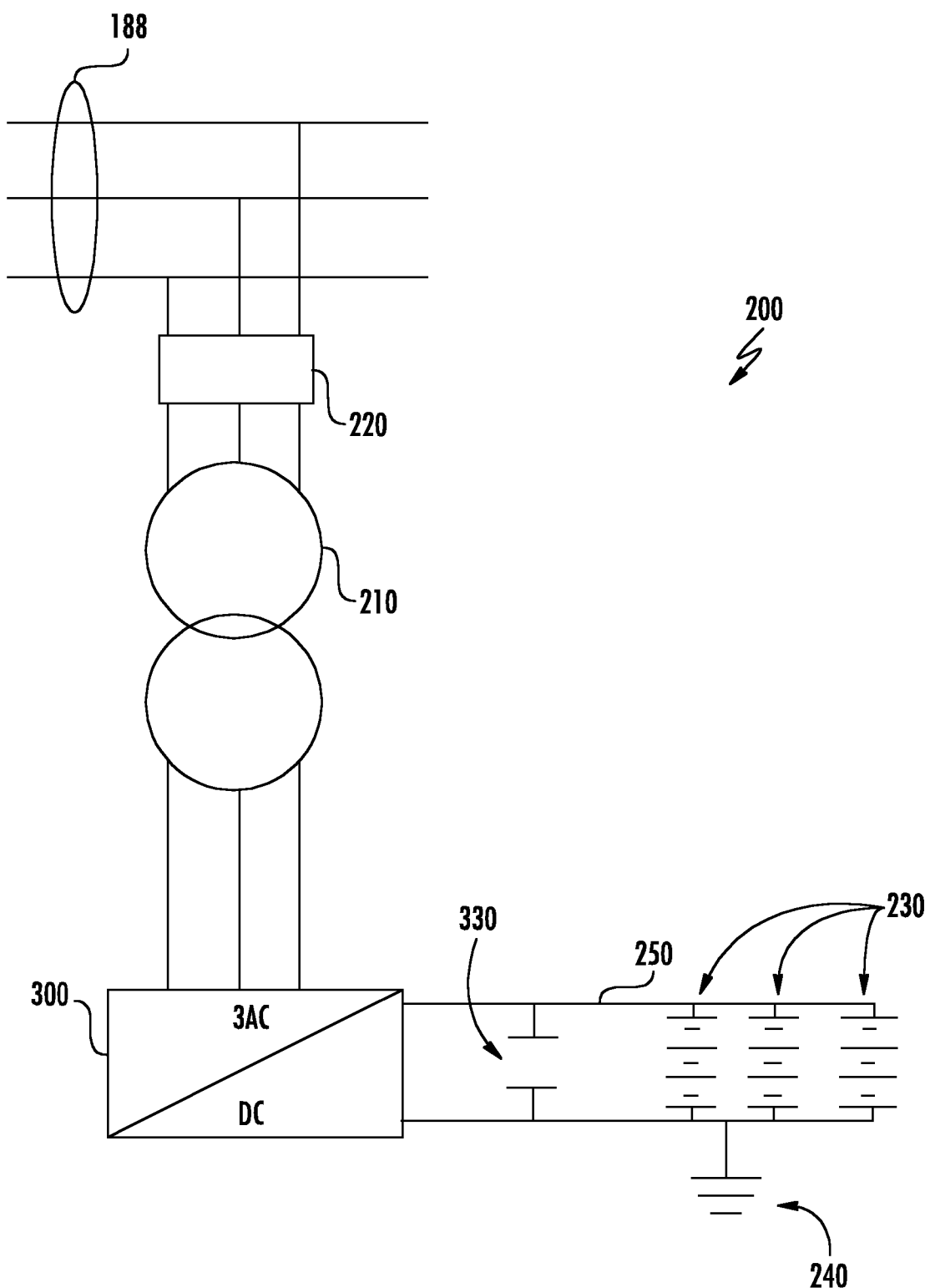
FIG. 2 depicts an example energy storage system coupled to an AC line bus of a power system according to example embodiments of the present disclosure.

FIG. 2 depicts an example energy storage system 200 coupled to the line bus 188 of a wind turbine system 100. The energy storage system 200 can include a transformer 210, a bi-directional AC to DC power converter 300, and one or more energy storage devices 230. The transformer 210 can be, for example, a two-winding transformer configured to convert the AC power from the line bus 188 at a first voltage to an AC power at a second voltage. The transformer 210 can be configured to receive a multi-phase (e.g. three-phase) power from the line bus 188 and transform the multiphase power from a first voltage to a second voltage. In an embodiment, the transformer 210 can be a step-down transformer configured to reduce the voltage of AC power from the line bus 188 to a lower voltage before providing the AC power to the bi-directional power converter 300. An energy storage system breaker 220 can be used to selectively couple or decouple the energy storage system 200 to/from the line bus 188.

Additionally, transformer 210 can provide isolation for the energy storage system 200. For example, a two-winding transformer 210 can have two windings inductively coupled together. As power flows through a first winding of the two-winding transformer 210, an electromagnetic field can be generated, thereby inducing an electric current in the second winding. However, because the two windings are inductively coupled and not directly coupled, the two-winding transformer can provide isolation for the energy storage system 200 from other components of the DFIG wind turbine system 100. Moreover, the transformer 210 can absorb common mode noise, such as high frequency noise and/or voltage spikes, thereby eliminating the need for a separate common mode filter. This can provide a cost savings advantage over other energy storage systems coupled to a DC link 136 in a power converter 162, as it can allow for a common mode filter to be eliminated from the energy storage system.

The bi-directional AC to DC power converter 300 can be configured to receive the multiphase power from the transformer 210 and convert the multiphase power from an AC power to a DC power. As will be discussed in greater detail with respect to FIG. 3, the bi-directional AC to DC power converter 300 can be a four-quadrant charge-discharge power converter. The DC power can be provided by the bi-directional power converter 300 to a DC bus 250. One or more energy storage devices 230 can be coupled to the DC bus 250. The one or more energy storage devices can be, for example, one or more batteries, capacitors, fuel cells, or other energy storage devices. As shown, a plurality of energy storage devices 230 is coupled in parallel to the DC bus 250.

In an embodiment, the energy storage system 200 can include a ground reference 240. For example, a ground reference 240 can be a neutral earth ground reference, which can be coupled to one or more energy storage devices by coupling the ground reference 240 to a terminal of the DC link 250. Because the energy storage system 200 is isolated from the DFIG wind turbine system 100 by the transformer 210, the ground reference 240 can be included in the energy storage system 200 to ground the energy storage devices 230, thereby reducing the likelihood of damaging the energy storage device 230 by a fault current. In an embodiment, a DC bus capacitor 330 can be coupled across the DC bus 250 in parallel with the one or more energy storage devices 230.

AC power generated by the rotor of the DFIG 120 can travel through the power converter 162 to the line bus 188, where it can be provided to the energy storage system 200. For example, AC power from the line bus 188 can flow through transformer 210 to bi-directional AC to DC power converter 300 to the line bus 250, where it can be stored in one or more energy storage devices 230. In an embodiment, energy stored in the one or more energy storage devices 230 can further be provided to the line bus 188. For example, DC power from the one or more energy storage devices 230 can be provided to DC bus 250, and to bi-directional AC to DC converter 300. Bi-directional AC to DC power converter 300 can convert the DC power to a multi-phase (e.g., three-phase) AC power, which can be provided to transformer 210. Transformer 210 can transform the AC power provided by the bi-directional AC to DC power converter 300 to an AC power at the same voltage as power on line bus 188. In this way, power can be provided from line bus 188 two energy storage device 230, and similarly power from energy device 230 can be provided to line bus 188.

In an embodiment, a control device, such as a control device 174 or a control system 176 can control switching of bi-directional AC to DC power converter 300 in order to control the flow of power between line bus 188 and the one or more energy storage devices 230. For example, a control device can provide one or more gating signals to one or more switching elements (e.g., IGBTs) in bi-directional AC to DC power converter 300 in order to control the flow of power in the energy storage system 200. Moreover, the energy storage system 200 can be configured to provide power to an electrical grid 160 by, for example, providing AC power to a line bus 188, which can then be transformed by a transformer 178 into AC power suitable for provision to an electrical grid 160.

An advantage provided by the energy storage system 200 according to example aspects of the present disclosure is that the energy storage system 200 can be retrofitted onto an existing wind turbine system. For example, in a typical energy storage system coupled to a DC link 136 of a power converter 162, the energy storage system must be designed to receive power at the same voltage as the DC link 136, and further include a bulky common mode filter configured to filter the power before it is provided to one or more energy storage devices in the energy storage system. However, the energy storage system 200 according to example aspects of the present disclosure can be retrofitted onto any line bus 188 of any DFIG wind turbine system. For example, the transformer 210 can be selected such that it is configured to transform AC power from a line bus 188 at a first voltage based on the type of wind generator used in the system to a second voltage suitable for a bi-directional power converter 300 to convert to a DC power at a voltage suitable for the one or more energy storage devices 230. In this way, the energy storage system 200 can be a stand-alone energy storage system configured to be added to an existing DFIG wind turbine system.

Further, in an embodiment, the energy storage system 200 according to example aspects the present disclosure can be coupled to a plurality of DFIG wind turbine systems 100. For example, the energy storage system 200 can be coupled to a line bus 188 in a plurality of DFIG wind turbine systems 100. For example, a plurality of breakers or switches can be configured to selectively allow power to flow from one or more line buses 188 in a plurality of DFIG wind turbine systems 100 to the energy storage system 200, and vice-versa.

Figure 3:
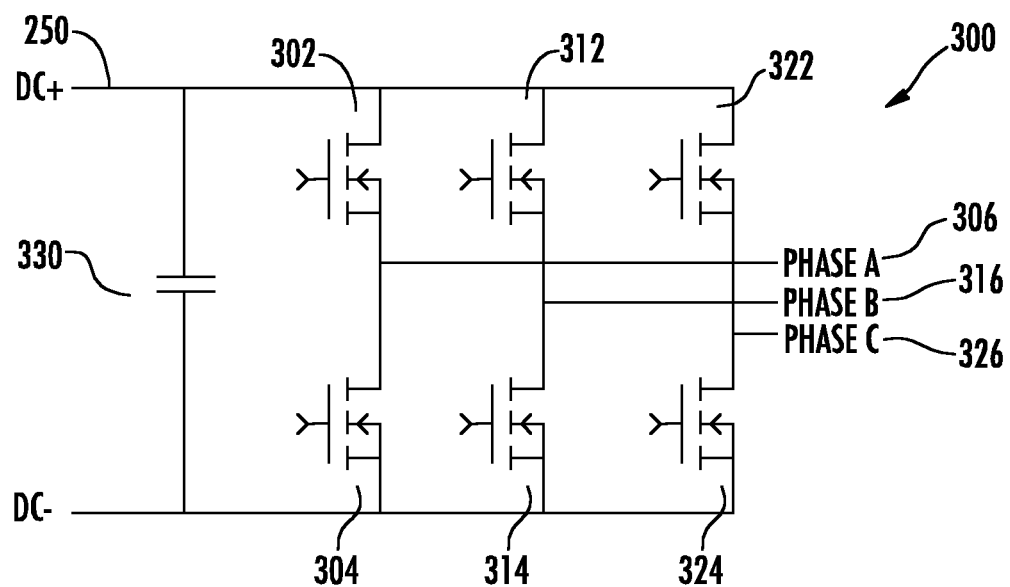
FIG. 3 depicts example topology for an example four quadrant charge discharge converter for an energy storage system according to example embodiments of the present disclosure.

Referring now to FIG. 3, a bi-directional AC to DC power converter 300 according to example aspects of the present disclosure is depicted. As shown, bi-directional AC to DC power converter 300 is a three-phase four-quadrant charge-discharge AC to DC power converter capable of bi-directional power flow. One of ordinary skill in the art will recognize that any suitable bi-directional AC to DC power converter can be used. Bi-directional power converter 300 can include a plurality of switching devices, such as IGBTs, MOSFETs, or other switching devices. For example, bi-directional AC to DC power converter 300 can include a plurality of bridge circuits, one for each phase of a multi-phase AC power output. For example, for a three-phase power output, three bridge circuits can be included in a bi-directional power converter 300, wherein each bridge circuit includes two switching devices (e.g., IGBTs). As depicted in FIG. 3, a first bridge circuit can include a first IGBT 302 and a second IGBT 304 for phase A 306 of a three phase output, a second bridge circuit can include a third IGBT 312 and a fourth IGBT 314 for phase B 316 of a three phase output, and a third bridge circuit can include a fifth IGBT 322 and a sixth IGBT 324 for phase C 326 of a three phase output. The bi-directional AC to DC power converter 300 can further include a capacitor 330 connected across a DC bus 250. Switching commands can be provided by a control device or control system, such as a control device 174 or control system 176, which can control the switching of the IGBTs to convert DC power to a three phase AC power and vice-versa. In example configurations, PWM switching commands can be provided to the IGBTs.

During a first AC to DC mode of operation, multi-phase (e.g., three-phase) AC power can be provided to the bi-directional AC to DC power converter via phase A 306, phase B 316, and phase C 326 coupled to a two-winding transformer 210. Switching commands can be provided to the IGBTs to convert the AC power to a DC power, which can be provided to DC bus 250, thereby charging capacitor 330. Power from DC bus 250 can then be used to charge one or more energy storage devices 230 connected to the DC bus 250.

During a second DC to AC mode of operation, DC power from one or more energy storage devices 230 can be provided to DC bus 250. Switching commands can be provided to the IGBTs to convert the DC power from the DC bus 250 to an AC power provided to phase A 306, phase B 316, and phase C 326, and further, to two-winding transformer 210. In this way, the bi-directional AC to DC power converter 330 can be used to provide power to or from the energy storage devices and an AC line bus.

Figure 4:
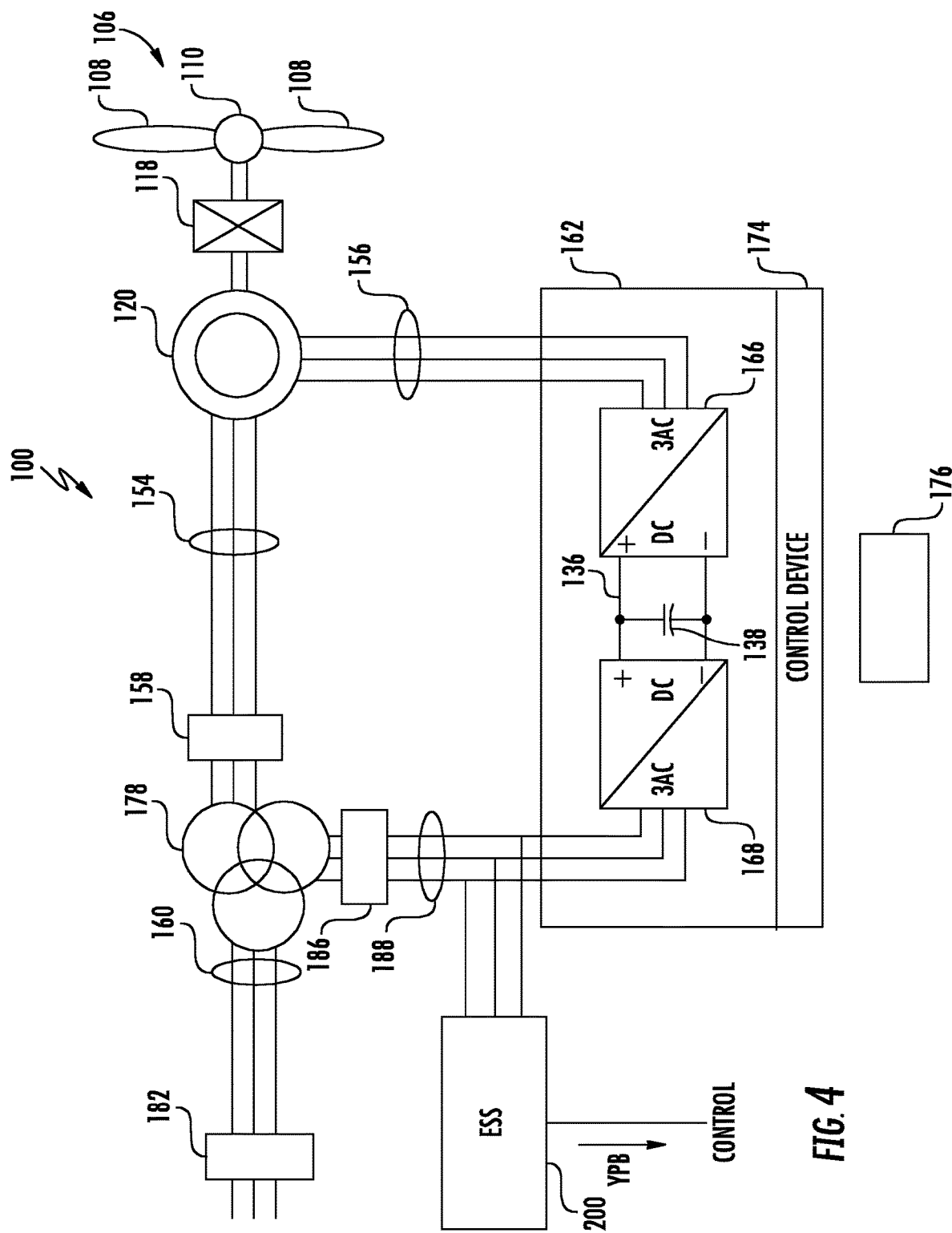
FIG. 4 depicts an example power flow of a power system in a yaw power backup mode according to example embodiments of the present disclosure.

Referring now to FIG. 4, an example power flow in a wind turbine system 100 in a yaw power backup mode is depicted. As shown, a wind turbine system 100 can be a DFIG wind turbine system as depicted in FIG. 1, and elements that are the same or similar to those depicted in FIG. 1 are referred to with the same reference numerals.

As shown, one or more control systems can be configured to receive power from the energy storage system 200. For example, a wind turbine system 100 can include a yaw system configured to yaw a wind turbine into or out of the direction of the wind by rotating a nacelle of the wind turbine in order to position the nacelle into or out of the wind. In a typical embodiment, the yaw system can rotate a tower upon which a nacelle is fixed in a stationary position, or the yaw system can rotate a nacelle on top of a stationary tower. During periods of high winds, such as when the wind speed exceeds a threshold, it may be desirable to yaw a wind turbine out of the wind by positioning the nacelle of the wind turbine at an angle with respect to the predominant wind direction. For example, in order to protect one or more components of the wind turbine, it may be desirable to position the nacelle at an angle with respect to the wind in order to reduce stresses and loads placed on the turbine by the wind. A control device/control system, such as a control device 174 or a control system 176 can be configured to receive data indicative of a wind speed and wind direction from one or more wind speed sensors, such as an average wind speed and direction over a period of time. The wind sensors can be, for example, one or more anemometers or other wind speed sensors. In an embodiment, the yaw system can be a regenerative yaw system configured to generate power by allowing the wind to adjust a yaw angle of the wind turbine.

When the wind exceeds a threshold, the yaw system can position the nacelle of the wind turbine at an angle with respect to the wind in order to reduce the load and stresses placed upon the wind turbine by the wind. The control system can determine a desired yaw angle and send one or more commands to the yaw system in order to control one or more yaw motors to position the turbine at the desired yaw angle. However, during periods of operation in which a grid event has occurred, such as a fault requiring a wind turbine or windfarm to be isolated from an electrical grid, the yaw system may be unpowered and therefore unable to position the turbine at the desired yaw angle.

According to example aspects of the present disclosure, an energy storage system 200 can be configured to operate in a yaw power backup mode wherein the energy storage system 200 is configured to provide electrical power from the one or more energy storage devices 230 to one or more control systems associated with the wind turbine system. For example, the energy storage system 200 can provide electrical power to a control system, such as a control device 174 or control system 176, in order to allow the necessary computations to be performed (i.e., desired yaw angle computations) by the control device/control system and further to provide power to one or more motors in the yaw system to allow the yaw system to position the wind turbine at the desired yaw angle. In this way, the energy storage system 200 can be controlled to operate in a yaw power backup mode wherein a yaw system can be powered by the energy storage system 200.

Figure 5:
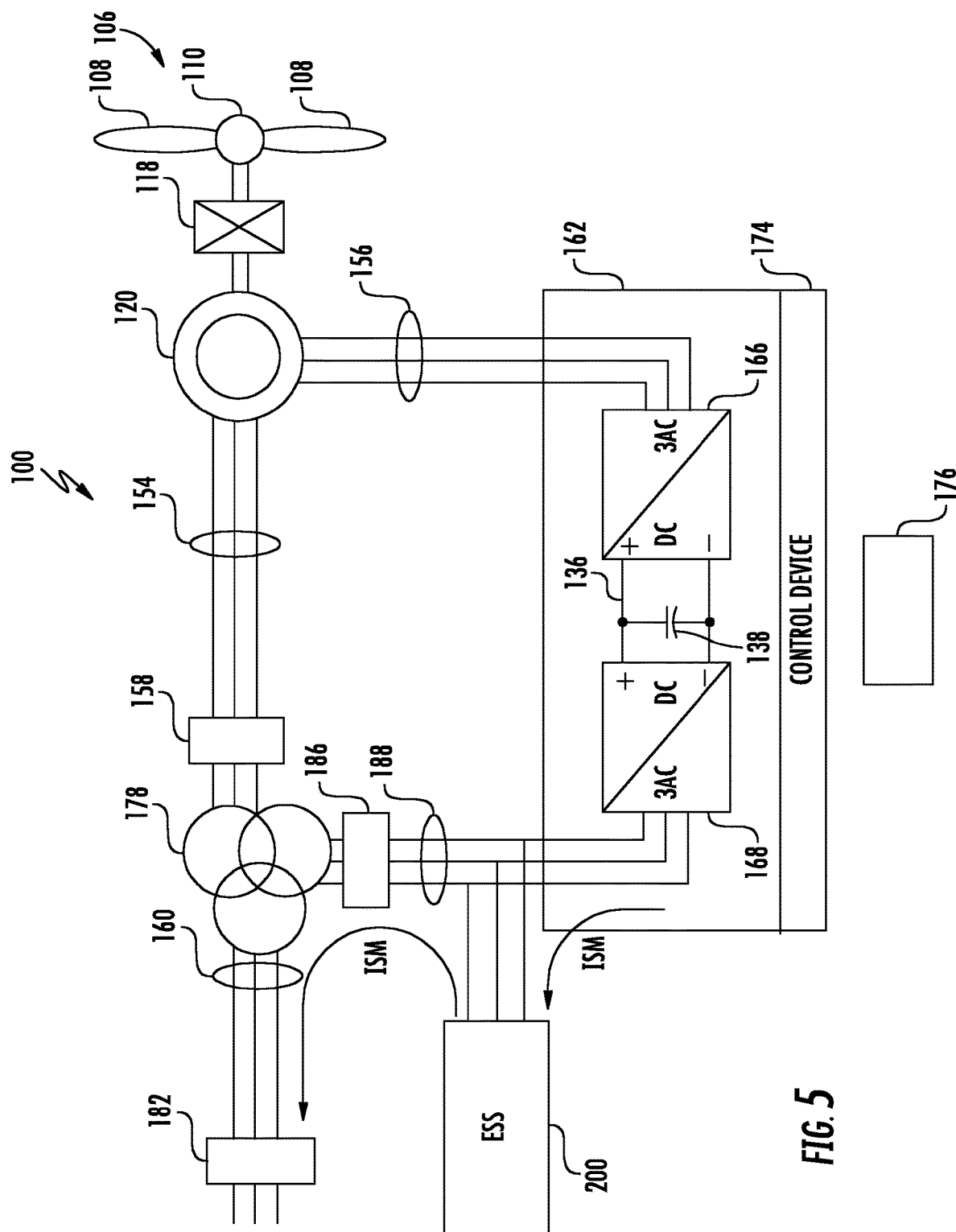
FIG. 5 depicts an example power flow of a power system in an integrated storage mode according to example embodiments of the present disclosure.

Referring now to FIG. 5, an example power flow in a wind turbine system 100 in an integrated storage mode is depicted. As shown, a wind turbine system 100 can be a DFIG wind turbine system as depicted in FIGS. 1 and 4, and elements that are the same or similar to those depicted in FIGS. 1 and 4 are referred to with the same reference numerals.

As shown, AC power from a power conversion system 162 can be provided to an energy storage system 200 via an AC line bus 188, or vice-versa. In an embodiment, the flow of power from the AC line bus to the energy storage system 200 can be controlled by a control device/control system, such as a control device 174 or a control system 176. Further, energy stored in the energy storage system 200 can be provided to an electrical grid 160 by, for example, providing power to the AC line bus 188, or vice-versa. From there, the power provided to the AC line bus 188 can flow through a three-winding transformer 178 to an electrical grid 160. In this way, the energy storage system 200 can be configured to store power received by the energy storage system, and further can be configured to provide electrical power to an electrical grid.

The operation of the energy storage system 200 can be controlled based on one or more operating parameters of the wind turbine system 100. For example, a control device/control system can be configured to receive data indicative of one or more operating parameters which can be used to determine an operation mode of the energy storage system 200 and/or wind turbine system 100. For example, a control device/control system can be configured to determine a grid parameter, such as whether an electrical grid is experiencing normal operations, or whether a grid event, such as a fault has occurred. If the grid is experiencing normal operations (i.e., the grid "OK" and is not experiencing a fault), and the wind speed is less than a threshold wind speed above which the wind turbine cannot operate normally, the wind turbine system 100 and energy storage system 200 can be controlled to an integrated storage mode. For example, in the integrated storage mode, power can either be provided from the wind turbine to the energy storage system 200, from the wind turbine to the electrical grid 160, or from the energy storage system 200 and/or wind turbine to the electrical grid 160.

For example, depending upon additional operational parameters, such as a power demand parameter and a power generation parameter, the integrated storage mode can either allow for energy to be stored or provided by the energy storage system. The power demand can be, for example, determined by a dispatch parameter from a utility company, and a power generation parameter can be, for example, a power output from a wind turbine. When the power demand parameter is less than the power generation parameter, excess power can be provided to the energy storage system 200 to allow for the energy to be stored for a later time period. If the power demand parameter is the same as the power generation parameter, power from the wind turbine, such as a DFIG, can be provided directly to the electrical grid 160. If, however, the power demand parameter is greater than the power generation parameter, power can be provided by the energy storage system 200 in addition to power provided by the wind turbine. For example, power generated by the rotor can be provided to an AC line bus 188, and energy stored in the energy storage system 200 can also be provided to the AC line bus 188 in order for the total power provided by the wind turbine system 100 to meet the power demand parameter. In this way, the integrated storage mode can allow for energy to be provided to an energy storage system during periods of excess generation, while allowing for the energy storage system to provide supplemental power during periods of insufficient power generation.

Figure 6:
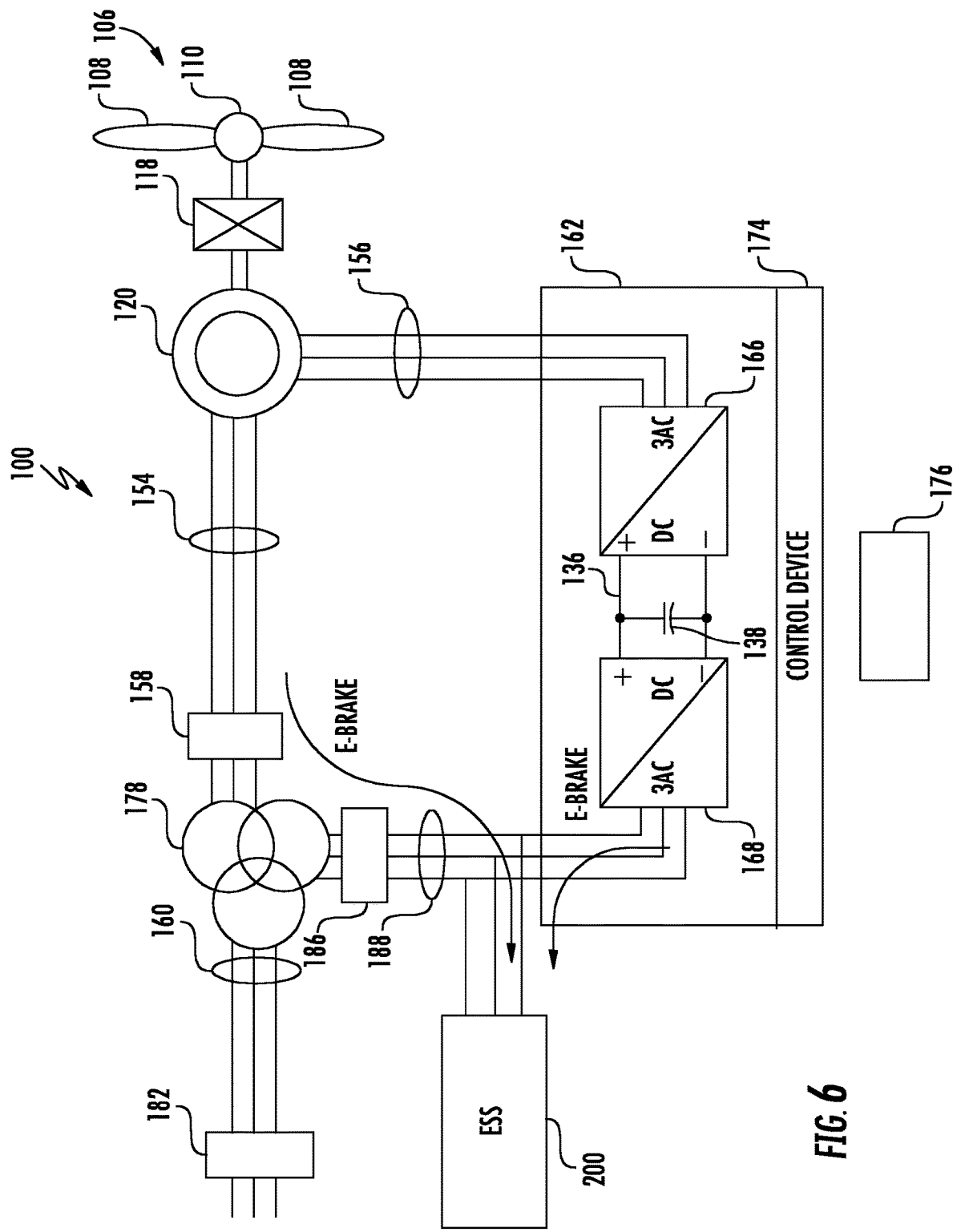
FIG. 6 depicts an example power flow of a power system in an emergency brake mode according to example embodiments of the present disclosure.

Referring now to FIG. 6, an example power flow in a wind turbine system 100 in an e-brake mode is depicted. As shown, a wind turbine system 100 can be a DFIG wind turbine system as depicted in FIGS. 1, 4, and 5, and elements that are the same or similar to those depicted in FIGS. 1, 4, and 5 are referred to with the same reference numerals.

As depicted, power generated by a DFIG 120 can be provided to an energy storage system 200 to provide braking for the wind turbine. For example, during periods of operation of a wind turbine system 100, it may be desirable to slow or stop the wind turbine due to one or more operating parameters. For example, in the event of normal grid operations, power generated by wind turbine system 100 can be provided to an electrical grid 160. If, however, a fault event has occurred on an electrical grid 160, it may be necessary to decouple the wind turbine system 100 from the electrical grid 160. In such an event, it may be necessary to slow and/or stop the wind turbine so that power is no longer generated while the wind turbine is isolated from the electrical grid 160.

For example, if a grid is not experiencing normal operations, the wind turbine system 100, and in particular the energy storage system 200, can be controlled to an e-brake mode (e.g., "emergency brake" or "energy brake" mode). In the e-brake mode, the energy storage system 200 can be configured to receive power from the DFIG wind turbine system 100 to provide braking for the DFIG wind turbine system. For example, in the e-brake mode, power generated by the DFIG 120 can be routed from either a stator side or rotor side of the DFIG 120 to allow for braking to occur. Power from the stator can be provided to a three-winding transformer 178 via a stator bus 154, and from the three-winding transformer 178 can be provided to an AC line bus 188. Similarly, power from the rotor can be provided to a rotor bus 156, to a power conversion system 162, and to the AC line bus 188. From the AC line bus 188, power can be provided to the emergency storage system 200, where the power can be stored in one or more energy storage devices 230.

In an embodiment, the wind turbine system 100 can be controlled to the e-brake mode based on one or more operating parameters, such as a grid parameter, and an aerodynamic braking deceleration parameter. For example, in order to slow and/or stop a wind turbine, a control system can pitch the blades on a wind turbine in order to provide aerodynamic braking to the wind turbine. In an embodiment, if the aerodynamic braking is insufficient, such as, for example, if the wind turbine is not decelerating at a rate faster than a threshold deceleration rate, the e-brake mode can be activated to provide braking to the wind turbine. In this way, operating the wind turbine system 100 in an e-brake mode can allow for the wind turbine to be slowed and/or stopped.

Figure 7:
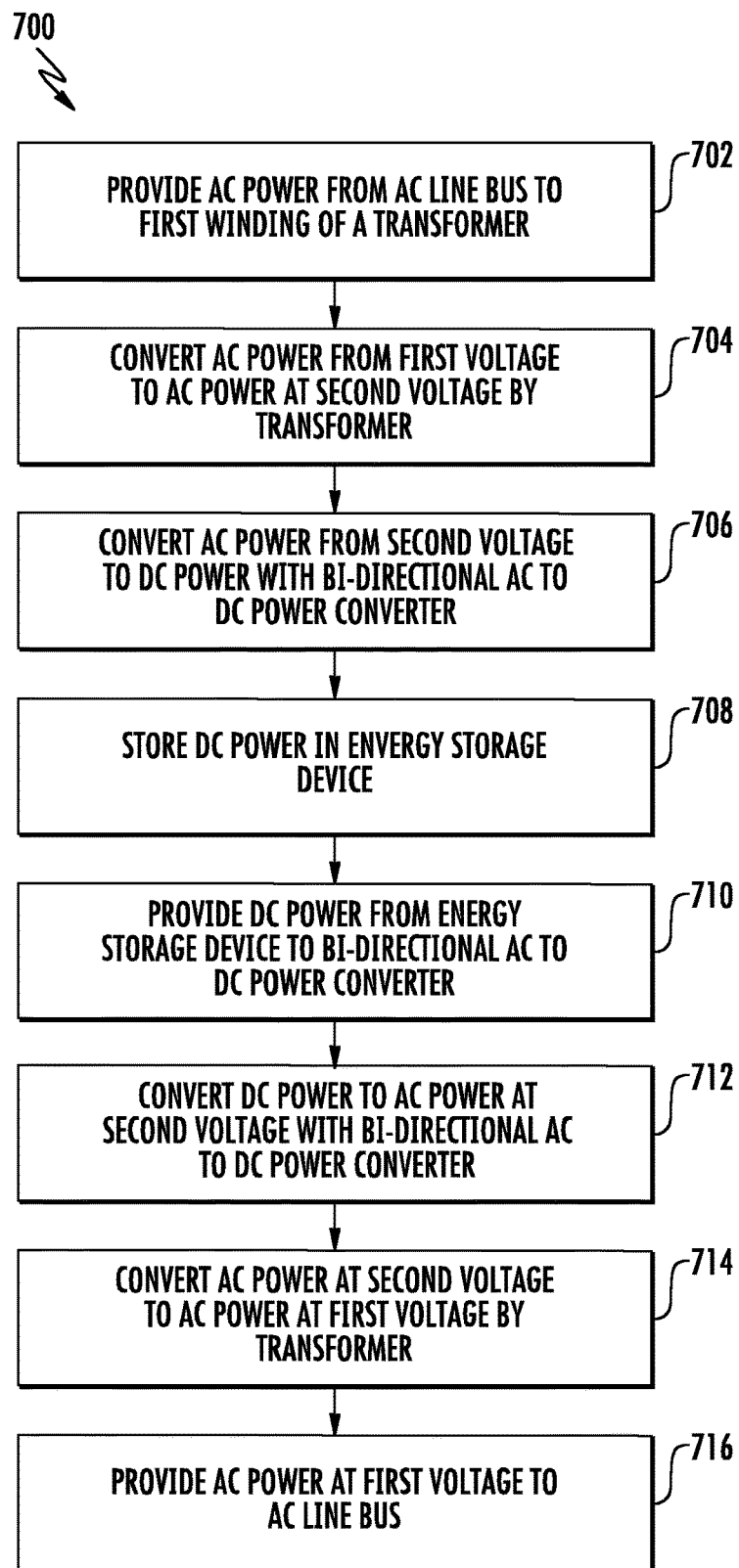
FIG. 7 depicts an example method according to example aspects of the present disclosure.

FIG. 7 depicts a flow diagram of an example method (700) for operating an energy storage system according to an example embodiment of the present disclosure. The method 700 can be implemented using any suitable energy storage system, such as the energy storage system 200 depicted in FIG. 2. In addition, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (702), a method (700) can include providing AC power from an AC line bus to a first winding of a transformer. For example, a two-winding step-down transformer 210 can be connected to an AC line bus 188. AC power from the AC line bus 188 can be provided to the first winding of the two-winding transformer 210.

At (704), a method (700) can include converting the AC power from a first voltage to an AC power at a second voltage by the transformer. For example, as an AC current flows to the first winding the two-winding transformer 210, an electrical field will be generated. The electrical field can induce a second current in the second winding of the two-winding transformer 210. In an embodiment, the two-winding transformer can be a step down transformer, wherein the transformer is configured to receive AC power at a first voltage and convert it to AC power at the second voltage, wherein the second voltage is a lower voltage than the first voltage.

At (706), the method (700) can include converting the AC power at the second voltage to a DC power with a bi-directional AC to DC power converter. For example, a four-quadrant charge-discharge AC to DC power converter 300 can be coupled to the second winding of the two-winding transformer 210. The AC power at the second voltage from the second winding of the two-winding transformer 210 can be converted by the four-quadrant charge-discharge AC to DC power converter 300 into a DC power, which can be provided to a DC bus 250.

At (708), the method (700) can include storing the DC power in an energy storage device. For example, one or more energy storage devices 230, such as one or more batteries, can be coupled in parallel to the DC bus 250. DC power from the bi-directional AC to DC power converter 300 can be provided to the DC bus 250, where it can be stored in the one or more energy storage devices 230. In this way, AC power from an AC line bus 188 in a wind turbine system 100 can be stored in one or more energy storage devices 230 in an energy storage system 200.

At (710), the method (700) can include providing DC power from an energy storage device to the bi-directional AC to DC power converter. For example, the one or more energy storage devices 230 coupled to the DC bus 250 can provide a DC power to the DC bus 250. The DC power can be provided to the bi-directional AC to DC power converter 300 via the DC bus 250.

At (712), the method (700) can include converting the DC power to AC power at the second voltage with the bi-directional AC to DC power converter. For example, the bi-directional AC to DC power converter 300 can be capable of bi-directional power flow, and can convert the DC power to an AC power at the second voltage.

At (714), the method (700) can include converting the AC power at the second voltage to AC power at the first voltage by a transformer. For example, AC power at the second voltage can be provided from the bi-directional AC to DC power converter 300 to the second winding of a two-winding transformer 210. The current flowing through the second winding of the two-winding transformer 210 can generate an electrical field, which can induce a current in the first winding of the two-winding transformer 210. As noted, the two-winding transformer 210 can be configured to convert AC power at a first voltage to AC power at a second voltage, or vice versa. When AC power is provided to the second winding, the two-winding transformer 210 can act as a step up transformer configured to convert the AC power at the second voltage to an AC power at the first voltage.

At (716), the method (700) can include providing AC power at the first voltage to an AC line bus. For example, the first winding of the two-winding transformer 210 can be coupled to an AC line bus 188. The AC power at the first voltage can thereby be provided to the AC line bus 188. In an embodiment, the AC power can be a multi-phase (e.g., three-phase) AC power. In this way, energy stored in an energy storage device 230 and an energy storage system 200 can be provided to an AC line bus 188 in a wind turbine system 100.

Figure 8:
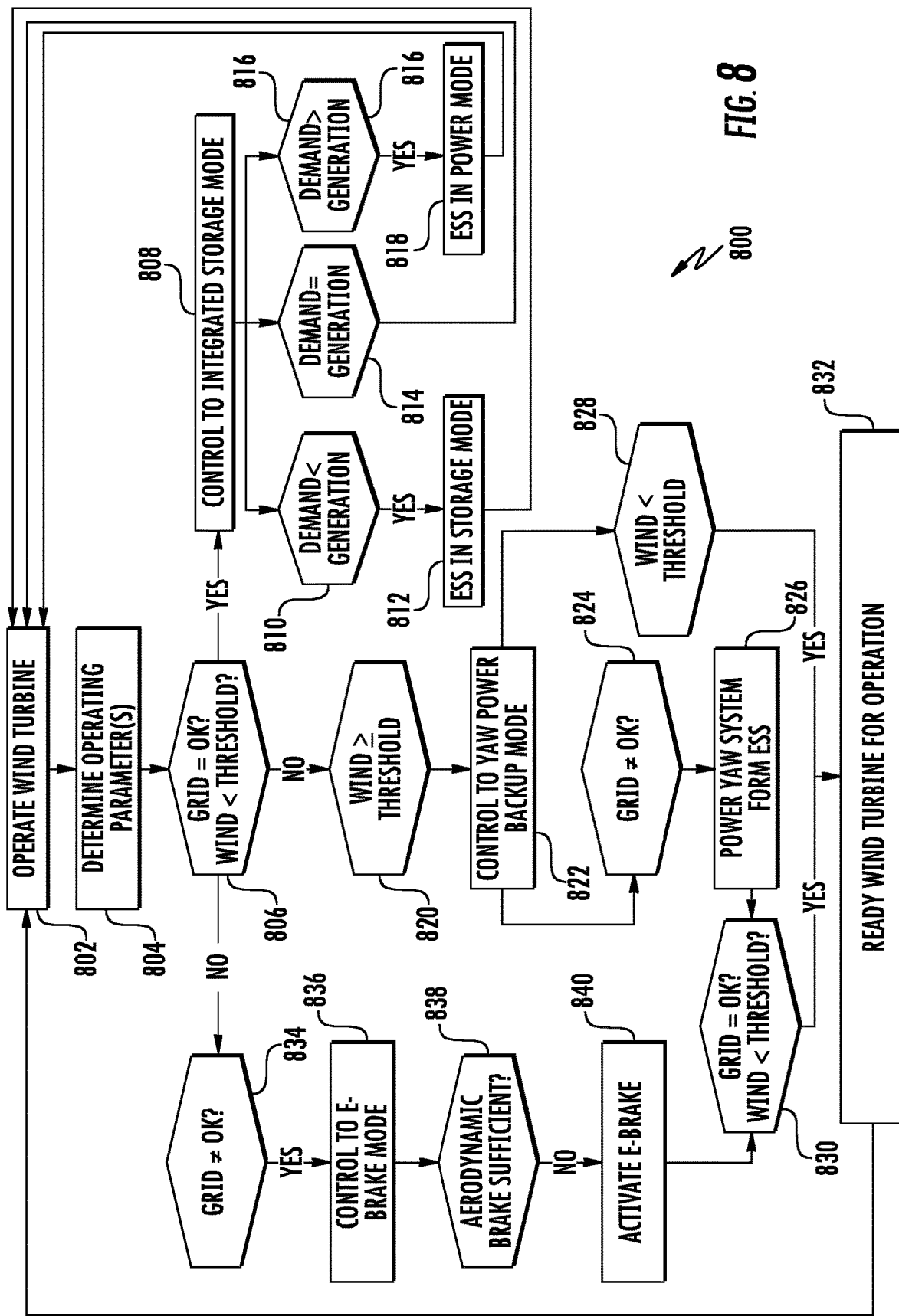
FIG. 8 depicts an example method according to example aspects of the present disclosure.

Referring now to FIG. 8, a flow diagram of an example method (800) for operating a wind turbine system according to an example embodiment of the present disclosure is depicted. The method (800) can be implemented using any suitable wind turbine system 100 which includes an energy storage system, such as the energy storage system 200 depicted in FIG. 2. For example, the method (800) can be implemented using a DFIG wind turbine system, a full-power conversion wind turbine system, or any other wind turbine system. In addition, FIG. 8 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (802), the method (800) can include operating a wind turbine to generate power. For example, a wind turbine can be a DFIG wind turbine wherein power is provided to an electrical grid via a dual path-way defined by a rotor and a stator of the DFIG, or the wind turbine can be a full-power conversion wind turbine or other wind turbine in a wind turbine system 100. An energy storage system can be coupled to an AC line bus of the wind turbine system 100. The energy storage system can include a transformer, a power converter, and an energy storage device, and the energy storage system can be configured to store and provide power generated by the wind turbine.

At (804), the method (800) can include determining one or more operating parameters for the wind turbine system by a control device. The control device can be, for example, a control device 174 or a control system 176 as described herein. The one or more operating parameters can include a grid parameter, a power demand parameter, a power generation parameter, a wind parameter, or other parameters. A grid parameter can be, for example, a grid status such as whether a grid is experiencing normal operations, or whether a grid event has occurred whereby the grid is not operating normally, such as when a fault occurs. A wind parameter can be, for example, a wind speed and/or direction, and can be an average wind speed and/or direction over a period of time. A power demand parameter can be an amount of power demanded by an electrical grid 160, such as, for example, a power demand set by a dispatch setpoint from a utility company for a specified time period. A power generation parameter can be, for example, an amount of power generated by the wind turbine, which can include power generated by a rotor and a stator of a DFIG. Other parameters can also be determined, depending upon an operational mode of the wind turbine system. The method (800) can further include determining an operating mode for the wind turbine system based at least in part on the one or more operating parameters and controlling, by the control device, the wind turbine system based at least in part on the operating mode. Additionally, controlling the wind turbine can include controlling an energy flow into or out of the energy storage system coupled to the AC line bus 188.

For example, at (806), the method (800) can include determining whether a grid parameter is experiencing normal operation (i.e., the grid is "OK" and not experiencing a fault condition) and whether the wind parameter is less than a threshold. For example, a threshold can be a threshold above which a wind turbine is not operated due to mechanical, safety, or other operational constraints. For example, when the wind speed is above a threshold, such as 30 m/s, a wind turbine may be shut down in order to prevent damage from occurring to one or more components of the wind turbine. Similarly, if a grid is experiencing a fault condition, the wind turbine system may need to be isolated from the electrical grid, and therefore the wind turbine may need to be shut down. If, however, the grid parameter is in normal operation and the wind speed is less than the threshold, the control device can select an integrated storage mode at (808) and can control the wind turbine based at least in part on the integrated storage mode. As used herein, the term "integrated storage mode" means any mode of operation in which power from a wind turbine can be provided to or from an energy storage system.

At (808), while in the integrated storage mode, the method (800) can include determining and comparing additional operating parameters, such as a power demand parameter and a power generation parameter. As noted, a power demand parameter can be a power demanded by an electrical grid, and a power generation parameter can be a power generation level from the wind turbine system. The power demand and power generation parameters can be determined by, for example, current and voltage measurements in the wind turbine system, and/or by communicating with a control system, such as a control room for an electric utility company.

At (810), when the power demand parameter is less than the power generation parameter, the method (800) can include controlling the energy storage system to an energy storage mode at (812). In the energy storage mode, at least a portion of the power generated by the wind turbine can be stored in the energy storage system 200. For example, power generated by a rotor of a DFIG can be provided to an AC line bus 188 where it can be provided to the energy storage system 200. In a full-power conversion wind turbine, at least a portion of power generated by the wind turbine can similarly be provided to an energy storage system 200. In this way, the excess power generated by the wind turbine can be stored in the energy storage system 200 when the energy storage system is operated in a storage mode.

If, however, at (814) the power demand parameter equals the power generation parameter, controlling the wind turbine system based at least in part on the integrated storage mode can include providing the power generated by the wind turbine to an electrical grid. For example, all of the power generated by a rotor and a stator of a DFIG can be provided to an electrical grid 160, with no power being provided to or from the energy storage system 200. Similarly, all power generated by a full-power conversion wind turbine system or other wind turbine can be provided to an electrical grid 160.

If, at (816) the power demand parameter is greater than the power generation parameter, controlling the wind turbine system based at least in part on the integrated storage mode can include controlling the energy storage system to a power mode at (818). For example, in the power mode, the energy storage system 200 can be configured to provide power to an electrical grid 160 by, for example, providing energy stored in one or more energy storage devices 230 in the energy storage system to an AC line bus 188. Thus, in the integrated storage mode, power can be provided to or from an energy storage system 200 by the wind turbine system 100, and further, the energy storage system 200 can be used to meet the power demands on the wind turbine system 100. Further, in the integrated storage mode, the wind turbine can be operated in a loop unless and until one of the conditions at (806) is no longer met.

For example, if at (806) the wind is greater than or equal to a threshold, at (820), determining an operating mode for the wind turbine system based at least in part on the one or more operating parameters can include selecting a yaw power backup mode at (822). For example, in the yaw power backup mode, power can be provided to a yaw system in order to yaw the wind turbine system 100 out of the wind in order to reduce the loads and stresses on the wind turbine. As used herein, the term "yaw power backup mode" means any mode of operation in which power from an energy storage system can be used to power a yaw system.

While operating in the yaw power backup mode, if, at (824) a grid parameter is not experiencing normal operation (i.e., the grid is not "OK" and/or experiencing a fault condition), the energy storage system 200 can be configured to provide power to a yaw system at (826). For example, if an electrical grid 160 is experiencing a fault, the wind turbine system 100 may need to be electrically isolated from the electrical grid 160. While the wind turbine system 100 is isolated from the electrical grid 160, power cannot be provided to the yaw system by the electrical grid 160. Therefore, the energy storage system 200 can be configured to provide power to the yaw system to allow for necessary computations to be performed as well as power to be provided to one or more yaw motors in order to allow the wind turbine to be positioned at a desired yaw angle. In one or more embodiments, in the yaw power backup mode, power can be provided to a yaw system from the energy storage system 200 regardless of whether a grid parameter is experiencing normal operation.

While in the yaw power backup mode, once a grid parameter returns to a normal operation and the wind speed is less than the threshold at (830), the wind turbine system 100 can be controlled to prepare the wind turbine for operation at (832). Similarly, while operating in the yaw power backup mode, if the grid parameter never experienced a fault (i.e., the grid was "OK"), once the wind parameter is less than the threshold at (828) the wind turbine can be controlled to prepare for operation at (832).

Returning to (806), if a grid parameter is a grid fault (i.e., the grid is not experiencing normal operation and/or not "OK") at (834) determining an operating mode for the wind turbine system 100 can include selecting an e-brake mode at (836). As used herein, the term "e-brake mode" means any mode of operation in which power from a wind turbine can be provided to an energy storage system to provide braking for the wind turbine. In the e-brake mode, power from the wind turbine system 100 can be provided to the energy storage system 200 to provide braking for the wind turbine when the e-brake is activated.

For example, while in the e-brake mode, it may be desirable to bring the wind turbine to a stop. A control system can control the pitch of the blades of the wind turbine in order to provide aerodynamic braking. If, however, at (838) the aerodynamic braking is insufficient to decelerate the wind turbine faster than a threshold deceleration, operating the wind turbine system in an e-brake mode can include activating an e-brake at (840) to decelerate the wind turbine. For example, both aerodynamic braking, wherein the rotor is slowed by pitch the blades out of the wind, and e-braking, wherein energy from the wind turbine is provided to an energy storage system 200) can be used to slow and/or stop the wind turbine. In this way, controlling the wind turbine system based at least in part on the e-brake mode can include providing power from the wind turbine system 100 to the energy storage system 200 to provide braking for the wind turbine when the e-brake is activated. In an embodiment, while operating in an e-brake mode, an e-brake can be activated such that power generated by the wind turbine is stored in the energy storage system 200 regardless of whether aerodynamic braking is sufficient to decelerate the wind turbine faster than a threshold deceleration rate.

While operating in the e-brake mode, if the electrical grid returns to normal operation and the wind parameter is below the threshold at (830), the wind turbine system 100 can be controlled to prepare the wind turbine for operation at (832). Once the wind turbine has been prepared for operation at (832), at (802) the wind turbine can be operated to generate power.

In this way, a wind turbine system 100 can be operated to generate power, and based on one or more operating parameters, the wind turbine system can be controlled to an integrated storage mode, a yaw power backup mode, and an e-brake mode in order to allow for power to be generated, stored, provided by an energy storage system, used to power a yaw system, and used to provide e-braking according in various operating conditions.

Figure 9:
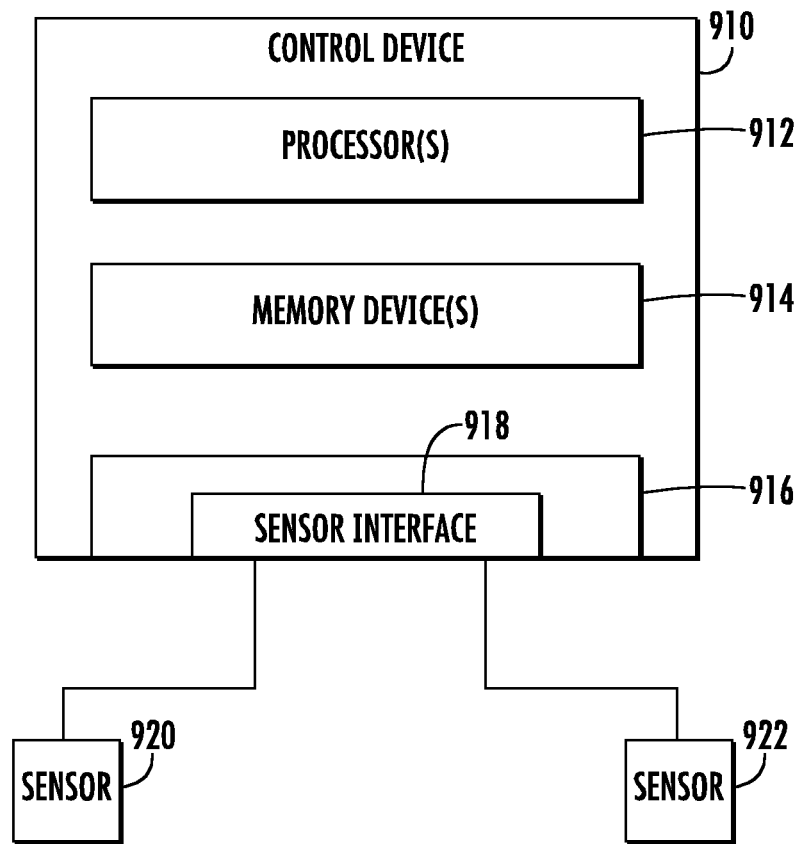
FIG. 9 depicts an example control device according to example aspects of the present disclosure.

FIG. 9 depicts an example control device 910 according to example embodiments of the present disclosure. The control device 910 can be, for example, a control device 174 or a control system 176, and can be associated with an individual wind turbine system, a wind farm (e.g., a cluster-level or farm-level control device) and/or can include one or more control devices associated with aspects of a wind turbine system, such as one or more control devices associated with a power conversion system 162. In some embodiments, the one or more control devices 910 can include one or more processor(s) 912 and one or more memory device(s) 914. The processor(s) 912 and memory device(s) 914 can be distributed so that they are located at one more locales or with different devices.

The processor(s) 912 and memory device(s) 914 can be configured to perform a variety of computer-implemented functions and/or instructions (e.g., performing the methods, steps, calculations and the like and storing relevant data as disclosed herein). The instructions when executed by the processor(s) 912 can cause the processor(s) 912 to perform operations according to example aspects of the present disclosure. For instance, the instructions when executed by the processor(s) 912 can cause the processor(s) 912 to implement the methods of FIGS. 7 (700) and 8 (800) discussed herein.

Additionally, the control device 910 can include a communication interface 916 to facilitate communications between the control device 910 and various components of a wind turbine system, wind farm, or power system, including power demand parameters or power generation setpoints as described herein. Further, the communication interface 918 can include a sensor interface 918 (e.g., one or more analog-to-digital converters) to permit signals transmitted from one or more sensors 920, 922 to be converted into signals that can be understood and processed by the processor(s) 912. It should be appreciated that the sensors (e.g. sensors 920, 922) can be communicatively coupled to the communications interface 918 using any suitable means, such as a wired or wireless connection. The signals can be communicated using any suitable communications protocol. The sensors (920, 922) can be, for example, voltage sensors, current sensors, power sensors, wind speed sensors, anemometers, or any other sensor device described herein.

As such, the processor(s) 912 can be configured to receive one or more signals from the sensors 920 and 922. For instance, in some embodiments, the processor(s) 912 can receive signals indicative of a wind speed or wind direction from the sensor 920, such as from one or more anemometers. In some embodiments, the processor(s) 912 can receive signals indicative of power delivery (e.g. amount of power generated) from sensor 922.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 914 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 914 can generally be configured to store suitable computer-readable instructions that, when implemented by the processor(s) 912, configure the control device 910 to perform the various functions as described herein.

Figure 10:
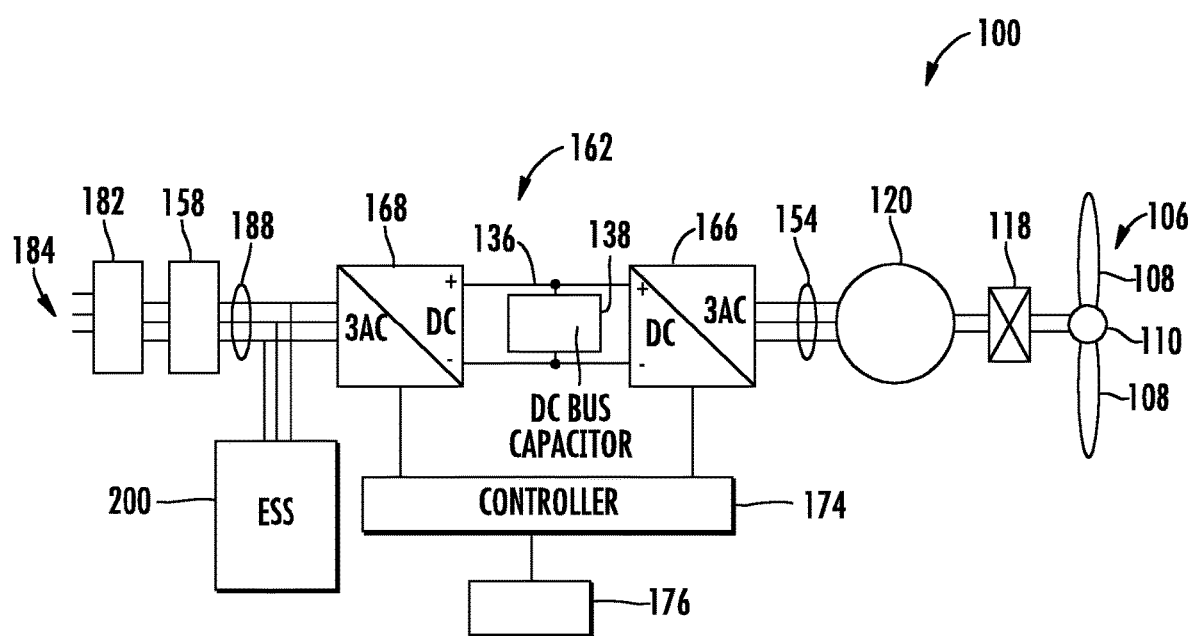
FIG. 10 depicts an example power system according to example aspects of the present disclosure.

Referring now to FIG. 10, an example power system 100 in a full-power conversion configuration is depicted. Elements that are the same or similar to those in FIG. 1 are referred to with the same reference numerals. As shown, in a full-power conversion configuration, all power generated by a generator 120 can be provided to a power converter 162. The power converter 162 can be connected to a line side bus 188. As shown, an energy storage system 200 as described herein can be connected to the line side bus 188. The line side bus 188 can be connected to an electrical grid 184.

Figure 11:
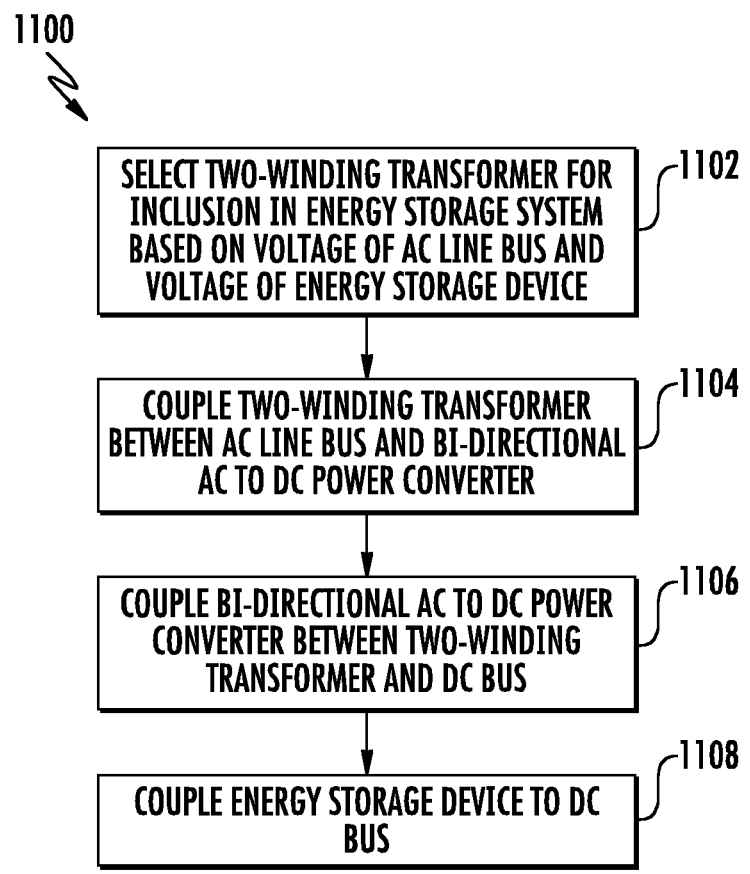
FIG. 11 depicts an example method according to example aspects of the present disclosure.

Referring now to FIG. 11, a flow diagram of an example method (1100) for retrofitting a wind turbine system with an energy storage system according to example aspects of the present disclosure is depicted. The energy storage system can include a bi-directional AC to DC power converter and an energy storage device. The method (1100) can be implemented using any suitable wind turbine system 100 which includes an energy storage system, such as the energy storage system 200 depicted in FIGS. 1, 2, and 10. For example, the method (1100) can be implemented using a DFIG wind turbine system, a full-power conversion wind turbine system, or any other wind turbine system. In addition, FIG. 11 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (1102), the method (1100) can include selecting a two-winding transformer for inclusion in the energy storage system based on a voltage of an AC line bus and the voltage of an energy storage device. For example, a two-winding transformer 210 can be selected in order to step down the voltage from the line side bus 188 to a second voltage, such as a voltage that is appropriate for providing to a bi-directional AC to DC power converter 300. For example, the bi-directional AC to DC power converter 300 can be configured to convert AC power at the second voltage to DC power at a voltage suitable for the energy storage device 230. The two-winding transformer can be selected based at least in part on the voltage of the line side bus 188 and the voltage of the energy storage device 230.

At (1104), the method (1100) can include coupling the two-winding transformer between the AC line bus and the bi-directional AC to DC power converter. For example, the two-winding transformer 210 can be configured to receive a multiphase (e.g., three-phase) AC power from the line side bus 188. The two-winding transformer 210 can be electrically connected to each phase of the multi-phase line side bus 188. Once coupled, power can flow from the line side bus 188 to the two-winding transformer 210, and vice-versa.

At (1106), the method (1100) can include coupling the bi-directional AC to DC power converter between the two-winding transformer and a DC bus. For example, a bi-directional AC to DC power converter 300 can be electrically connected to a two-winding transformer 210 and a DC bus 250. Once coupled, power can flow from the two-winding transformer 210 to the DC bus 250, and vice-versa, such as when a control device 174 controls switching of the bi-directional AC to DC power converter.

At (1108), the method (1100) can include coupling the energy storage device to the DC bus. For example, one or more energy storage devices 230 can be coupled to a DC bus 250. Once coupled, the energy storage device can be configured to receive and store power from the AC line bus 188, and further can be configured to provide energy stored in the energy storage device 230 to the AC line bus 188. In this way, the systems and methods according to example aspects of the present disclosure can allow for an energy storage system 200 to be a stand-alone energy storage system, which can be retrofitted to an existing wind turbine system 100.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a wind turbine system, the wind turbine system comprising a wind turbine, a power conversion system operably coupled to the wind turbine and an AC line bus, and an energy storage system coupled to the AC line bus, the energy storage system comprising a transformer; a power converter, and an energy storage device, the energy storage system configured to store and provide power generated by the wind turbine; the method comprising:
   operating the wind turbine system to generate power;
   determining, by a control device, one or more operating parameters for the wind turbine system, the one or more operating parameters comprising a grid parameter and a wind parameter, the grid parameter indicative of a status of an electrical grid associated with the wind turbine system;
   determining, by the control device, an operating mode for the wind turbine system based at least in part on the one or more operating parameters; and
   controlling, by the control device, the wind turbine system based at least in part on the operating mode;
   wherein controlling, by the control device, the wind turbine system comprises controlling an energy flow into or out of the energy storage system coupled to the AC line bus, and
   wherein when the wind parameter is less than a threshold and the grid parameter indicates the electrical grid is operating without a fault condition, determining the operating mode for the wind turbine system comprises:
      selecting, by the control device, an integrated storage mode, wherein the integrated storage mode includes at least one of the following operations, based at least in part on the wind parameter, providing power from the wind turbine to the energy storage system, providing power from the energy storage system and the wind turbine to the electrical grid, and providing power from the energy storage system to the electrical grid.

2. The method of claim 1, wherein when the grid parameter indicates the electrical grid is operating with a fault condition, determining an operating mode for the wind turbine system comprises selecting a yaw power backup mode, or an e-brake mode.

3. The method of claim 1, wherein:
   the one or more operating parameters further comprise at least one of a power demand parameter and a power generation parameter.

4. The method of claim 1, wherein:
   the one or more operating parameters further comprise a power demand parameter and a power generation parameter;
   when the power demand parameter is less than the power generation parameter, controlling, by the control device, the wind turbine system based at least in part on the integrated storage mode comprises controlling the energy storage system to an energy storage mode; and
   when the energy storage system is in the energy storage mode, at least a portion of the power generated by the wind turbine is stored in the energy storage system.

5. The method of claim 1, wherein:
   the one or more operating parameters further comprise a power demand parameter and a power generation parameter; and
   when the power demand parameter equals the power generation parameter, controlling, by the control device, the wind turbine system based at least in part on the integrated storage mode comprises providing power generated by the wind turbine to the electrical grid.

6. The method of claim 1, wherein:
   the one or more operating parameters further comprise a power demand parameter and a power generation parameter;
   when the power demand parameter is greater than the power generation parameter, controlling, by the control device, the wind turbine system based at least in part on the integrated storage mode comprises controlling the energy storage system to a power mode; and
   when the energy storage system is in the power mode, at least a portion of the energy stored in the energy storage system is provided to the electrical grid.

7. The method of claim 1, wherein when the wind parameter is greater than or equal to the threshold, determining, by the control device, an operating mode for the wind turbine system comprises selecting a yaw power backup mode.

8. The method of claim 7, wherein when the grid parameter indicates a grid fault associated with the electrical grid, controlling, by the control device, the wind turbine system based at least in part on the yaw power backup mode comprises providing power to a yaw system from the energy storage system.

9. The method of claim 1, wherein when the grid parameter indicates a grid fault associated with the electrical grid, determining, by the control device, an operating mode for the wind turbine system comprises selecting an e-brake mode.

10. The method of claim 9, wherein when aerodynamic braking is insufficient to decelerate the wind turbine faster than a threshold deceleration, controlling, by the control device, the wind turbine system based at least in part on the e-brake mode comprises activating an e-brake to decelerate the wind turbine;
   wherein power from the wind turbine system is provided to the energy storage system to provide braking for the wind turbine when the e-brake is activated.

11. A control system for an energy storage system in a wind turbine system, the wind turbine system comprising a wind turbine, a power conversion system operably coupled to a generator and an AC line bus, and an energy storage system coupled to the AC line bus, the energy storage system comprising a transformer, a power converter, and an energy storage device, the energy storage system configured to store and provide power generated by the wind turbine; the control system comprising:
    one or more processors and one or more memory devices configured to store instructions that when executed by the one or more processors cause the one or more processors to perform operations, the operations comprising:
    determining one or more operating parameters of the wind turbine system, the one or more operating parameters comprising a grid parameter and a wind parameter, the grid parameter indicative of a status of an electrical grid associated with the wind turbine system;
    determining an operating mode for the wind turbine system based at least in part on the one or more operating parameters; and
    controlling the wind turbine system based at least in part on the operating mode;
    wherein controlling the wind turbine comprises controlling an energy flow into or out of the energy storage system coupled to the AC line bus; and
    wherein when the wind parameter is less than a threshold and the grid parameter indicates the electrical grid is operating without a fault condition, determining the operating mode for the wind turbine system comprises:
        selecting an integrated storage mode, wherein the integrated storage mode includes at least one of the following operations, based at least in part on the wind parameter, providing power from the wind turbine to the energy storage system, providing power from the energy storage system and the wind turbine to the electrical grid, and providing power from the energy storage system to the electrical grid.

12. The control system of claim 11, wherein the one or more operating parameters further comprise a power generation parameter and a power demand parameter;
    when the power demand parameter is less than the power generation parameter, controlling the wind turbine system based at least in part on the integrated storage mode comprises controlling the energy storage system to an energy storage mode; and
    when the energy storage system is in the energy storage mode, at least a portion of the power generated by the wind turbine is stored in the energy storage system.

13. The control system of claim 11, wherein:
    the one or more operating parameters further comprises a power generation parameter and a power demand parameter; and
    when the power demand parameter equals the power generation parameter, controlling the wind turbine system based at least in part on the integrated storage mode comprises providing power generated by the wind turbine to the electrical grid.

14. The control system of claim 11, wherein:
    the one or more operating parameters further comprise a power generation parameter and a power demand parameter;
    when the power demand parameter is greater than the power generation parameter, controlling the wind turbine system based at least in part on the integrated storage mode comprises controlling the energy storage system to a power mode; and
    when the energy storage system is in the power mode at least a portion of the energy stored in the energy storage system is provided to the electrical grid.

15. The control system of claim 11, wherein:
    when the grid parameter indicates a grid fault associated with the electrical grid and the wind parameter is greater than or equal to the threshold, determining an operating mode of the wind turbine system comprises selecting a yaw power backup mode; and
    controlling the wind turbine system based at least in part on the yaw power backup mode comprises providing power to a yaw system from the energy storage system.

16. The control system of claim 11, wherein when the grid parameter indicates a grid fault associated with the electrical grid, controlling an operating mode of the wind turbine system comprises controlling the wind turbine system to an e-brake mode.

17. The control system of claim 16, wherein determining one or more parameters of the wind turbine system further comprises determining whether an aerodynamic braking is insufficient to decelerate the wind turbine faster than a threshold deceleration, and
    wherein when the aerodynamic braking is insufficient to decelerate the wind turbine faster than the threshold deceleration, controlling the wind turbine system based at least in part on the e-brake mode comprises activating an e-brake to decelerate the wind turbine;
    wherein power from the wind turbine system is provided to the energy storage system t provide braking for the wind turbine when the e-brake is activated.

18. A Doubly Fed Induction Generator (DFIG) wind turbine system, comprising:
    a DFIG comprising a rotor and a stator;
    a rotor bus coupled to the rotor;
    a stator bus coupled to the stator;
    a power conversion system coupled to the rotor bus;
    a line bus coupled to the power conversion system;
    an energy storage system coupled to the line bus; the energy storage system comprising a transformer, a power converter, and an energy storage device, the energy storage system configured to store and provide power generated by the DFIG; and
    a control system comprising one or more processors and one or more memory devices configured to store instructions that when executed by the one or more processors cause the one or more processors to perform operations, the operations comprising:
        determining one or more operating parameters of the DFIG wind turbine system, the one or more operating parameters comprising a grid parameter and a wind parameter, the grid parameter indicative of a status of an electrical grid associated with the DFIG wind turbine system;
        determining an operating mode for the DFIG wind turbine system based at least in part on the one or more operating parameters; and
        controlling the DFIG wind turbine system based at least in part on the operating mode;
        wherein controlling the wind turbine system based at least in part on the operating mode comprises controlling an energy flow into or out of the energy storage system;

wherein determining an operating mode of the MG wind turbine system comprises selecting an integrated storage mode, a yaw power backup mode, or an e-brake mode; and wherein when the wind parameter is less than a threshold and the grid parameter indicates the electrical grid is operating without a fault condition, determining the operating mode for the wind turbine system comprises:

selecting an integrated storage mode, wherein the integrated storage mode includes at least one of the following operations, based at least in part on the wind parameter, providing power from the wind turbine to the energy storage system, providing power from the energy storage system and the wind turbine to the electrical grid, and providing power from the energy storage system to the electrical grid.

* * * * *